US011211602B2

(12) United States Patent
Yamaguchi et al.

(10) Patent No.: US 11,211,602 B2
(45) Date of Patent: Dec. 28, 2021

(54) ELECTROCHEMICAL DEVICE

(71) Applicant: Panasonic Intellectual Property Management Co., Ltd., Osaka (JP)

(72) Inventors: Takumi Yamaguchi, Kyoto (JP); Nao Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 16/476,100

(22) PCT Filed: Jan. 25, 2018

(86) PCT No.: PCT/JP2018/002275
§ 371 (c)(1),
(2) Date: Jul. 4, 2019

(87) PCT Pub. No.: WO2018/143049
PCT Pub. Date: Aug. 9, 2018

(65) Prior Publication Data
US 2019/0355984 A1 Nov. 21, 2019

(30) Foreign Application Priority Data

Jan. 31, 2017 (JP) .............................. JP2017-015864

(51) Int. Cl.
*H01M 4/36* (2006.01)
*H01G 11/28* (2013.01)
(Continued)

(52) U.S. Cl.
CPC ............ *H01M 4/366* (2013.01); *H01G 11/28* (2013.01); *H01G 11/32* (2013.01); *H01G 11/48* (2013.01);
(Continued)

(58) Field of Classification Search
None
See application file for complete search history.

(56) References Cited

U.S. PATENT DOCUMENTS

2006/0172134 A1* 8/2006 Ro .................. H01M 4/133
428/408
2013/0330617 A1* 12/2013 Yoshimura ............. H01G 11/28
429/211
2014/0178718 A1* 6/2014 Kano ................ H01M 10/0525
429/7

FOREIGN PATENT DOCUMENTS

CN 103887083 A 6/2014
JP 2013-164939 8/2013
(Continued)

OTHER PUBLICATIONS

International Search Report of PCT application No. PCT/JP2018/002275 dated Apr. 17, 2018.
(Continued)

*Primary Examiner* — Daniel S Gatewood
(74) *Attorney, Agent, or Firm* — McDermott Will and Emery LLP

(57) ABSTRACT

An electrochemical device includes a positive electrode, a negative electrode, and a separator disposed between these electrodes. The positive electrode includes a positive current collector containing a first metal, a carbon layer containing a conductive carbon material, a barrier layer disposed between the positive current collector and the carbon layer, and an active layer disposed on the carbon layer. The barrier layer has conductivity and higher acid resistance than the positive current collector. The active layer contains a conductive polymer. The first metal is preferably aluminum.

11 Claims, 2 Drawing Sheets

(51) Int. Cl.
- *H01G 11/32* (2013.01)
- *H01G 11/48* (2013.01)
- *H01G 11/52* (2013.01)
- *H01M 4/137* (2010.01)
- *H01M 4/60* (2006.01)
- *H01M 4/62* (2006.01)
- *H01M 4/66* (2006.01)
- *H01M 4/02* (2006.01)

(52) U.S. Cl.
CPC ............ *H01G 11/52* (2013.01); *H01M 4/137* (2013.01); *H01M 4/602* (2013.01); *H01M 4/625* (2013.01); *H01M 4/661* (2013.01); *H01M 2004/028* (2013.01)

(56) References Cited

FOREIGN PATENT DOCUMENTS

| | | |
|---|---|---|
| JP | 2014-035836 | 2/2014 |
| JP | 2014-123641 | 7/2014 |
| JP | 2017-073423 | 4/2017 |

OTHER PUBLICATIONS

English Translation of Chinese Office Action dated Sep. 30, 2021 for the related Chinese Patent Application No. 201880008013.X.

* cited by examiner

ELECTROCHEMICAL DEVICE

TECHNICAL FIELD

The present invention relates to an electrochemical device including an active layer containing a conductive polymer.

BACKGROUND

In recent years, attention has been paid to an electrochemical device having performances intermediate between lithium ion secondary batteries and electric double layer capacitors. For example, use of a conductive polymer as a positive electrode material has been considered (see Unexamined Japanese Patent Publication No. 2014-35836). Since electrochemical devices containing, as a positive electrode material, a conductive polymer are charged and discharged by adsorption of anions (doping) and desorption of the anions (dedoping), these devices are small in reaction resistance. Thus, the electrochemical devices have a higher output of power than general lithium ion secondary batteries.

SUMMARY

Various methods can be used for charging and discharging electrochemical devices. For example, in float charging, a constant voltage is continuously applied to an electrochemical device. However, in the case of using a positive electrode in which an active layer containing a conductive polymer is formed on a positive current collector, capacitance of the electrochemical device becomes small as a charging period becomes long. Thus, float property in the electrochemical device is lowered.

In light of the above, an electrochemical device according to an aspect of the present invention includes a positive electrode, a negative electrode, and a separator disposed between the positive electrode and the negative electrode. The positive electrode includes: a positive current collector containing a first metal, a carbon layer containing a conductive carbon material, a barrier layer disposed between the positive current collector and the carbon layer, and an active layer disposed on the carbon layer. The barrier layer has conductivity and higher acid resistance than the positive current collector. The active layer contains a conductive polymer.

According to the present invention, a lowering of float property in an electrochemical device can be suppressed.

DESCRIPTION OF EMBODIMENTS

In general, a positive current collector is made of a metallic material, and an oxidized film is usually formed on a surface of the positive current collector. Thus, an attempt to decrease resistance of the positive current collector has been made by forming a carbon layer containing a conductive carbon material onto the positive current collector. However, in the case of applying, to an electrochemical device, a positive electrode having such a carbon layer, float property in the electrochemical device may be lowered.

A reason why float property in the electrochemical device is lowered is presumed as follows: while this device is subjected to float charging, internal resistance of the positive electrode increases. This increase in the internal resistance makes a voltage applied to the positive electrode low, and thus capacity of the positive electrode decreases. This decrease in the capacity of the positive electrode means a lowering of float property in the electrochemical device. During the float charging, anions are unevenly located in a vicinity of the positive electrode. When the anions react with water that has entered in the electrochemical device, an acid is produced. When the produced acid reaches the positive current collector through gaps in the carbon layer, for example, the positive current collector dissolves or an oxidized film is formed on a surface of the positive current collector, so that internal resistance of the positive electrode is increased. As a result, float property in the electrochemical device would be lowered.

In order to prevent the above, a conductive barrier layer having higher acid resistance than the positive current collector is disposed between the positive current collector and the carbon layer. In this way, the acid produced during float charging of the electrochemical device is restrained from reaching the positive current collector. Thus, damage or oxidation of the positive current collector by the acid is suppressed. As a result, a lowering of float property in the electrochemical device can be suppressed.

<<Electrochemical Device>>

Figure 1:
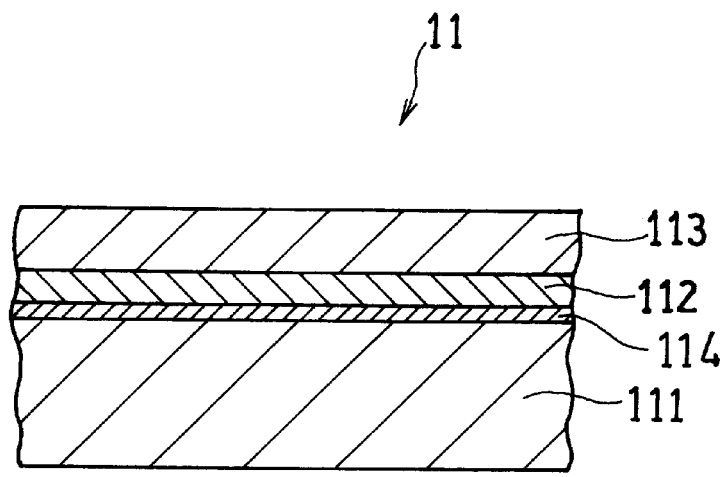
FIG. 1 is a schematic sectional view illustrating a positive electrode according to one exemplary embodiment of the present invention.

An electrochemical device according to the present exemplary embodiment includes an electrode group which includes a positive electrode, a negative electrode, a separator disposed between these electrodes. For example, as illustrated in FIG. 1, the positive electrode includes positive current collector 111, carbon layer 112 disposed over positive current collector 111, and active layer 113 disposed over carbon layer 112. Carbon layer 112 contains a conductive carbon material, and active layer 113 contains a conductive polymer. Positive electrode 11 further includes conductive barrier layer 114 disposed between positive current collector 111 and carbon layer 112. Barrier layer 114 has higher acid resistance than positive current collector 111 to restrain positive current collector 111 from being exposed to an acidic atmosphere.

Figure 2:
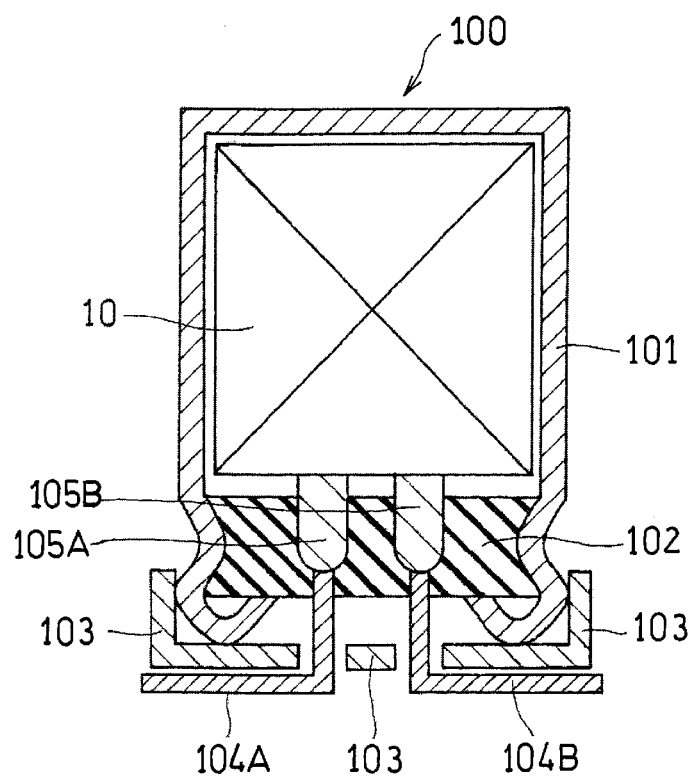
FIG. 2 is a schematic sectional view illustrating an electrochemical device according to one exemplary embodiment of the present invention.
Figure 3:
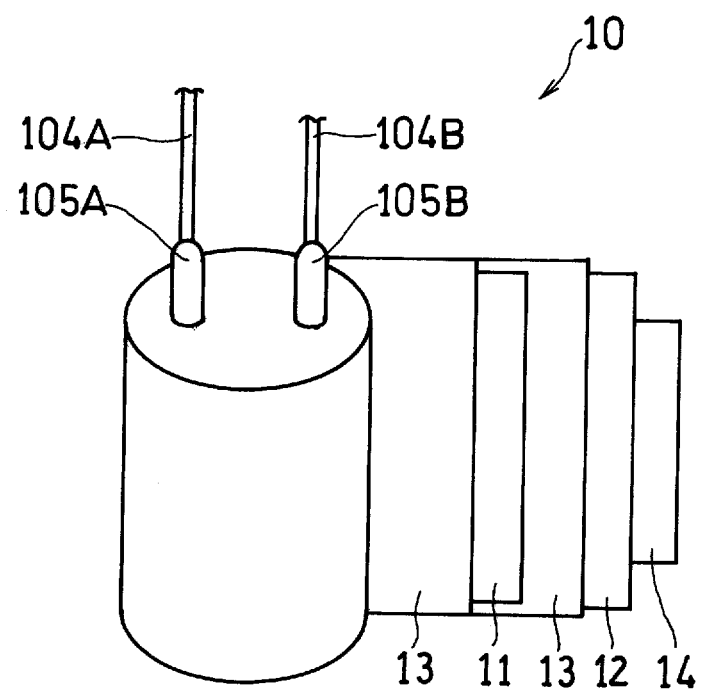
FIG. 3 is a schematic view for illustrating a structure of an electrode group according to the exemplary embodiment.

Hereinafter, a configuration of an electrochemical device according to the present invention will be described in more detail with reference to the drawings. FIG. 2 is a schematic sectional view illustrating electrochemical device 100 according to the present exemplary embodiment. FIG. 3 is a schematic developed view illustrating part of electrode group 10 included in electrochemical device 100.

Electrochemical device 100 includes electrode group 10; container 101 which houses electrode group 10; sealing body 102 for sealing an opening in container 101; base plate 103 covering sealing body 102; lead wires 104A and 104B which each lead out from sealing body 102 to penetrate base plate 103; and lead tabs 105A and 105B through which the lead wires are connected to the respective electrodes of electrode group 10. Container 101 is, at its part near an end of the opening, processed inward by drawing, and the opening end is curled to swage sealing body 102.

(Positive Current Collector)

For positive current collector 111, for example, a sheet-shaped metallic material is used. The sheet-shaped metallic material is, for example, a metal foil piece, a metal porous body, a punched metal, an expanded metal or an etched metal. A first metal contained in positive current collector 111 is preferably, for example, aluminum, an aluminum alloy, nickel, or titanium. The first metal is more preferably aluminum or an aluminum alloy.

When positive current collector 111 contains two or more metal elements (for example, when positive current collector 111 contains an alloy of two or more metal elements), the first metal is one of the metal elements that occupies positive current collector 111 in a proportion of 50% by mass or more. The aluminum alloy may contain an element other than aluminum (for example, iron, silicon, nickel or manganese) in a proportion that is, for example, less than 50% by mass, preferably less than or equal to 0.5% by mass. Even when positive current collector 111 contains aluminum, which has relatively low acid resistance, as the first metal, barrier layer 114 restrains positive current collector 111 from being damaged or oxidized while the electrochemical device is subjected to float charging. Positive current collector 111 has a thickness ranging, for example, from 10 μm to 100 μm, inclusive.

Positive current collector 111 may contain carbon atoms and/or nitrogen atoms. However, a content of the carbon atoms and/or nitrogen atoms in positive current collector 111 is preferably smaller than that in barrier layer 114 from the viewpoint of current-collecting performance and conductivity of positive current collector 111.

(Barrier Layer)

Barrier layer 114 has higher acid resistance than positive current collector 111, and further has conductivity. Barrier layer 114 contains, for example, a metal and/or metal compound. Examples of barrier layer 114 containing a metal and/or metal compound include three modes described below.

In a first mode, barrier layer 114 contains a compound of the first metal contained in positive current collector 111, and at least one of oxygen and nitrogen. The first metal contained in barrier layer 114 is derived from positive current collector 111. A carbide of the first metal and a nitride of the first metal are superior in acid resistance than a single substance of the first metal. In other words, barrier layer 114 containing the carbide of the first metal and the nitride of the first metal has higher acid resistance than positive current collector 111 containing the first metal.

Barrier layer 114 can be identified by, for example, a method described below.

Initially, an energy-dispersive X-ray spectroscopy (EDX) is used to perform element-mapping of a cross section of positive electrode 11 in a thickness direction of this electrode. From the element-mapping of a cross section of positive electrode 11, it is checked whether or not there is a layer containing the first metal and at least one of carbon atoms and nitrogen atoms, which is between the layer containing the first metal (positive current collector 111) and the layer (carbon layer 112) containing carbon atoms (conductive carbon material). When the layer containing the first metal and at least one of carbon atoms and nitrogen atoms is verified, a measurement of bonding energy between the first metal and at least one of the carbon atoms and nitrogen atoms for this layer is performed by X-ray photoelectron spectroscopy (XPS) with ion etching. In the measurement, when the bonding energy can be verified by the XPS, this layer can be specified as barrier layer 114.

A proportion of the carbon atoms and/or nitrogen atoms contained in barrier layer 114 is not particularly limited, and ranges, for example, from 5% by mass to 50% by mass, inclusive, and preferably from 15% by mass to 35% by mass, inclusive. When the carbon atoms and/or nitrogen atoms are contained in a proportion of the above-mentioned range in barrier layer 114, barrier layer 114 is further improved in acid resistance. The proportion by mass of the carbon atoms contained in barrier layer 114 can be calculated out, using, for example, a tubular electrical resistance furnace burning/infrared ray absorption method (JIS Z 2615). The proportion by mass of the nitrogen atoms in barrier layer 114 can be calculated out, using, for example, an inert gas melting/thermal conductivity method (JIS G 1228).

Barrier layer 114 in the first mode can be formed, for example, by heating positive current collector 111 in a hydrocarbon and/or nitrogen atmosphere. According to this method, the first metal present in the surface of positive current collector 111 reacts with the hydrocarbon and/or nitrogen to form barrier layer 114 containing a carbide and/or nitride of the first metal to cover the surface of positive current collector 111.

Barrier layer 114 containing the carbide of the first metal can be formed by heating positive current collector 111 in a hydrocarbon atmosphere after forming a carbon film onto positive current collector 111, for example, in a manner of vapor-depositing a conductive carbon material onto the surface of positive current collector 111. In this case, carbon present near an interface between the carbon film and positive current collector 111 reacts with the first metal to produce the carbide of the first metal. And the carbide of the first metal constitutes barrier layer 114. Other regions of the carbon film are remained to constitute carbon layer 112 covering barrier layer 114. In other words, this method makes it possible to form carbon layer 112 together with barrier layer 114, so that it is preferred from the viewpoint of productivity of these layers. Furthermore, this method is preferred also because carbon layer 112 can be formed without using a carbon paste described later, and acid resistance of carbon layer 112 can be improved.

In a second mode, barrier layer 114 contains a compound of a second metal and at least one of carbon and nitrogen. The second metal is different from the first metal. The first metal is a metal constituting positive current collector 111 (a metal derived from positive current collector 111). In contrast, the second metal is not derived from positive current collector 111. In this meaning, the second metal and the first metal are different from each other. The second metal is not particularly limited, and may be, for example, the same metals as given as the examples of the first metal. The first and second metals may be the same metal element, or different metal elements.

The carbide and/or nitride of the first metal is/are superior in acid resistance than a single body of the first metal. Further, usually, a carbide and/or nitride of any metal element other than the given examples of the first metal is/are also superior in acid resistance than the first metal single body. In other words, barrier layer 114, which contains the carbide and/or nitride of the second metal different from the first metal, has higher acid resistance than positive current collector 111, which contains the first metal. Barrier layer 114 in the second mode can also be specified in the same way as described above. Specifically, when a cross section of positive electrode 11 in the thickness direction of this electrode is analyzed using EDX and XPS, the following layer is specified as barrier layer 114: a layer which is arranged between the layer containing the first metal (positive current collector 111) and the layer (carbon layer 112) containing carbon atoms (conductive carbon material), and which is verified to have bonds between the second metal, and carbon atoms and/or nitrogen atoms.

Barrier layer 114 in the second mode can be formed, for example, by vapor-depositing a carbide of the second metal and/or a nitride of the second metal onto positive current collector 111. Alternatively, barrier layer 114 can be formed by heating positive current collector 111 in a hydrocarbon and/or nitrogen atmosphere after forming the second metal film onto positive current collector 111, for example, in a manner of vapor-depositing the second metal onto this current collector. Further alternatively, barrier layer 114 containing the carbide of the second metal can be formed by heating positive current collector 111 in a hydrocarbon atmosphere after forming a second metal film and a carbon film onto positive current collector 111, for example, in a manner of vapor-depositing the second metal and carbon successively onto this current collector. In this case, in the same manner as described above, carbon layer 112 is formed together with barrier layer 114.

In a third mode, barrier layer 114 contains a third metal having lower ionization tendency than the first metal. As described above, the first metal is a metal element occupying 50% by mass or more of positive current collector 111. Barrier layer 114 containing the third metal having lower ionization tendency than the first metal has higher acid resistance than positive current collector 111 containing the first metal. Specifically, when a cross section of positive electrode 11 in the thickness direction of this electrode is subjected to element-mapping using EDX, the following layer can be specified as barrier layer 114: a layer which is arranged between the layer containing the first metal (positive current collector 111) and the layer (carbon layer 112) containing carbon atoms (conductive carbon material), and which contains a metal element having smaller ionization tendency than the first metal.

Barrier layer 114 in the third mode can be formed, for example, by vapor-depositing or sputtering the third metal onto positive current collector 111. The third metal is not particularly limited as far as the metal having lower ionization tendency than the first metal. When the first metal is, for example, aluminum, examples of the third metal include titanium, tantalum, and zirconium. The barrier layer may contain one kind of third metal, or may contain two or more kinds of third metals. When the first metal is aluminum, the third metal is preferably nickel and/or titanium, among metals as described above, from the viewpoint of costs and resistances of the barrier layer.

A thickness of barrier layer 114 is not particularly limited, and ranges preferably from 5 nm to 200 nm, inclusive, more preferably from 10 nm to 200 nm, inclusive, and in particular preferably from 10 nm to 100 nm, inclusive, from the viewpoint of a protecting function of positive current collector 111 and resistance of the barrier layer. The thickness of barrier layer 114 is measurable by, for example, an XPS method. The thickness of barrier layer 114 can be obtained by measuring respective thicknesses of plural sites (for example, 10 sites) of barrier layers 114 and then averaging the thicknesses.

(Carbon Layer)

Carbon layer 112 is formed, for example, by vapor-depositing a conductive carbon material onto a surface of barrier layer 114. Alternatively, carbon layer 112 is formed by applying a carbon paste containing a conductive carbon material onto a surface of positive current collector 111 to form a coating film, and then drying the coating film. The carbon paste contains, for example, the conductive carbon material, a polymer material, and water or an organic solvent. Carbon layer 112 is preferably formed by vapor-depositing the conductive carbon material from the viewpoint of acid resistance of the layer. Carbon layer 112 may have a thickness ranging from 1 μm to 20 μm, inclusive, for example.

As the conductive carbon material, for example, graphite, hard carbon, soft carbon, and carbon black can be used. Among these conductive carbon materials, carbon black is preferable since this material easily forms carbon layer 112 that is thin and excellent in conductivity. Average diameter D1 of the conductive carbon material is not particularly limited, and ranges, for example, from 3 nm to 500 nm, inclusive, and preferably from 10 nm to 100 nm, inclusive. The average particle diameter is a median diameter (D50) in a volume particle size distribution that is obtained by a laser diffraction particle size distribution measuring apparatus (the same shall apply hereinafter). Average diameter D1 of carbon black may be calculated by an observation of this material through a scanning electron microscope.

The polymer material is not particularly limited, and is preferably, for example, fluororesin, acrylic resin, polyvinyl chloride, styrene-butadiene rubber (SBR), or water glass (polymer of sodium silicate) since such a material is electrochemically stable and is excellent in acid resistance.

(Active Layer)

Active layer 113 contains a conductive polymer. Active layer 113 is formed, for example, by immersing positive current collector 111 having barrier layer 114 and carbon layer 112 in a reaction liquid containing a raw material monomer for the conductive polymer, and subjecting the raw material monomer to electrolytic polymerization in the presence of positive current collector 111. At this time, positive current collector 111 is used as an anode to conduct the electrolytic polymerization. In this way, active layer 113 containing the conductive polymer is formed to cover a surface of carbon layer 112. A thickness of active layer 113 can be easily controlled by changing, for example, current density in the electrolysis or a period for the polymerization appropriately. The thickness of active layer 113 ranges, for example, from 10 μm to 300 μm, inclusive, per surface of the electrochemical device.

Active layer 113 may be formed by a method other than the electrolytic polymerization. Active layer 113 containing a conductive polymer may be formed, for example, by polymerizing the raw material monomer chemically. Alternatively, active layer 113 may be formed by using the conductive polymer, or a dispersion of this polymer.

The raw material monomer used in the electrolytic polymerization or the chemical polymerization may be a polymerizable compound capable of being polymerized to produce a conductive polymer. The raw material monomer may contain an oligomer. The raw material monomer to be used is, for example, aniline, pyrrole, thiophene, furan, thiophene vinylene, pyridine, or a derivative of any one of these monomers. These raw material monomers may be used alone or in combination of two or more of these monomers. The raw material monomer is preferably aniline since this compound allows active layer 113 to be easily formed on the surface of carbon layer 112.

As the conductive polymer, a π-conjugated polymer is preferred. As the π-conjugated polymer, for example, the following is usable: polypyrrole, polythiophene, polyfuran, polyaniline, polythiophene vinylene, polypyridine, or a derivative of any one of these polymers. These π-conjugated polymers may be used alone or in combination of two or more of these π-conjugated polymers. A weight-average molecular weight of the conductive polymer is not particularly limited, and ranges, for example, from 1000 to 100000, inclusive.

The derivatives of polypyrrole, polythiophene, polyfuran, polyaniline, polythiophene vinylene, and polypyridine mean polymers having, as their basic skeleton, polypyrrole, polythiophene, polyfuran, polyaniline, polythiophene vinylene, and polypyridine, respectively. For example, a polythiophene derivative includes poly(3,4-ethylenedioxythiophene) (PEDOT).

The electrolytic polymerization or the chemical polymerization is preferably performed by use of a reaction liquid containing an anion (dopant). Preferably, the dispersion or solution of the conductive polymer also contains a dopant. The π electron conjugated polymer exhibits excellent conductivity by doping the polymer with a dopant. For example, in the chemical polymerization, positive current collector 111 may be immersed in a reaction liquid containing a dopant, an oxidizing agent and a raw material monomer; picked out subsequently from the reaction liquid; and dried. In the electrolytic polymerization, positive current collector 111 and a counter electrode may be immersed in a reaction liquid containing a dopant and a raw material monomer; and positive current collector 111 and the counter electrode are used as an anode and a cathode, respectively, to cause an electric current to flow into between the two electrodes.

As a solvent in the reaction liquid, water may be used. A nonaqueous solvent may be used in consideration of solubility of the monomer. As the nonaqueous solvent, an alcohol can be desirably used, examples thereof including ethyl alcohol, methyl alcohol, isopropyl alcohol, ethylene glycol, and propylene glycol. Examples of the dispersing medium or solvent for the conductive polymer include water and these nonaqueous solvents.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl) imide ion ($N(CF_3SO_2)_2^-$), and a bis(trifluoromethanesulfonyl)imide ion ($N(CF_3SO_2)_2^-$). These dopants may be used alone or in combination of two or more of these dopants.

The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamide-2-methylpropanesulfonic acid), polyisoprenesulfonic acid, and polyacrylic acid. These dopants may be a homopolymer or a copolymer of two or more monomers. These dopants may be used alone or in combination of two or more of these dopants.

The reaction liquid, the dispersion of the conductive polymer, or the solution of the conductive polymer preferably has a pH ranging from 0 to 4 since the pH makes it easy to form active layer 113. Also when active layer 113 is formed in an acidic atmosphere in this way, barrier layer 114 restrains positive current collector 111 from being corroded. In this way, yielded electrochemical device 100 is restrained from being lowered in float property.

(Negative Electrode)

Negative electrode 12 includes, for example, a negative current collector and a negative electrode material layer.

For the negative current collector, for example, a sheet-shaped metallic material is used. The sheet-shaped metallic material is, for example, a metal foil piece, a metal porous body, a punched metal, an expanded metal or an etched metal. As a material for the negative current collector, for example, copper, a copper alloy, nickel, or stainless steel can be used.

The negative electrode material layer preferably contains, as a negative electrode active material, a material that electrochemically occludes and releases lithium ions. Examples of such a material include a carbon material, a metal compound, an alloy, and a ceramic material. As the carbon material, graphite, hardly-graphitizable carbon (hard carbon), and easily-graphitizable carbon (soft carbon) are preferable. Graphite and hard carbon are particularly preferable. Examples of the metal compound include silicon oxides and tin oxides. Examples of the alloy include silicon alloys and tin alloys. Examples of the ceramic material include lithium titanate and lithium manganate. These dopants may be used alone or in combination of two or more of these dopants. Among these materials, the carbon material is preferable since this material can lower negative electrode 12 in potential.

The negative electrode material layer preferably contains, in addition to the negative electrode active material, a conductive agent, a binder and others. Examples of the conductive agent include carbon black and a carbon fiber. Examples of the binder include a fluororesin, an acrylic resin, a rubber material, and a cellulose derivative. Examples of the fluororesin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include a styrene-butadiene rubber, and examples of the cellulose derivative include carboxymethyl cellulose.

The negative electrode material layer is formed, for example, by preparing a negative electrode mixture paste that contains a mixture of a negative electrode active material, a conductive agent, a binder and others with a dispersion medium, applying the negative electrode mixture paste to the negative current collector, followed by drying.

Negative electrode 12 is preferably pre-doped with lithium ions in advance. Thus, negative electrode 12 is lowered in potential, so that a difference in potential (that is, voltage) between positive electrode 11 and negative electrode 12 increases. Consequently, electrochemical device 100 is improved in energy density.

The pre-doping of negative electrode 12 with lithium ions is advanced, for example, by forming a metal lithium film that serves as a supply source of the lithium ions on a surface of the negative electrode material layer, and then impregnating negative electrode 12 having the metal lithium film with an electrolytic solution (for example, a nonaqueous electrolytic solution) having lithium ion conductivity. At this time, lithium ions are eluted from the metal lithium film into the nonaqueous electrolytic solution and the eluted lithium ions are occluded in the negative electrode active material. For example, when graphite or hard carbon is used as the negative electrode active material, lithium ions are inserted into between layers of graphite or into fine pores of hard carbon. An amount of the lithium ions, with which the negative electrode is to be pre-doped, can be controlled by a mass of the metal lithium film.

The step of pre-doping negative electrode 12 with lithium ions may be performed before electrode group 10 is assembled, or the pre-doping may be advanced after electrode group 10 is housed, together with the nonaqueous electrolytic solution, in case 101 for electrochemical device 100.

(Separator)

For separator 13, for example, the following is preferably used: a nonwoven fabric made of cellulose fiber, a nonwoven fabric made of glass fiber, a microporous membrane made of polyolefin, a fabric cloth, or a nonwoven fabric. Separator 13 has, for example, a thickness ranging from 10 μm to 300 μm, inclusive, and preferably from 10 μm to 40 μm, inclusive.

(Nonaqueous Electrolytic Solution)

Electrode group 10 preferably contains a nonaqueous electrolytic solution.

The nonaqueous electrolytic solution has lithium ion conductivity, and contains a lithium salt and a nonaqueous solvent in which the lithium salt is dissolved. At this time, the following can be reversely repeated: doping of positive electrode 11 with anions of the lithium salt; and anion-dedoping of this electrode. In contrast, reversely, lithium ions derived from the lithium salt are occluded into negative electrode 12, and released from this negative electrode.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. These lithium salts may be used alone or in combination of two or more of these lithium salts. Among these lithium salts, at least one selected from the group consisting of lithium salts having an oxo acid anion containing a halogen atom suitable for an anion, and lithium salts having an imide anion is preferably used. A concentration of the lithium salt in the nonaqueous electrolytic solution in the charged state (state-of-charge (SOC): 90% to 100%) ranges, for example, from 0.2 mol/L to 5 mol/L, inclusive.

As the nonaqueous solvent, cyclic carbonates such as ethylene carbonate, propylene carbonate, and butylene carbonate; chain carbonates such as dimethyl carbonate, diethyl carbonate, and ethyl methyl carbonate; aliphatic carboxylates such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; and dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone can be used. These solvents may be used alone, or may be used in combination of two or more of these solvents.

In the nonaqueous electrolytic solution, an additive may be added to the nonaqueous solvent as required. For example, an unsaturated carbonate such as vinylene carbonate, vinyl ethylene carbonate or divinyl ethylene carbonate may be added as an additive for forming a film high in lithium ion conductivity on the surface of negative electrode surface 12.

<Production Method>

Hereinafter, one example of a method for producing electrochemical device 100 of the present invention will be described with reference to FIGS. 2 and 3. However, the method for producing electrochemical device 100 of the present invention is not limited to this example.

Electrochemical device 100 is produced by, for example, a method including the following steps. A first step is preparing a laminate including positive current collector 111, conductive barrier layer 114 having higher acid resistance than positive current collector 111, and carbon layer 112 containing a conductive carbon material which are laminated in this order. A second step is forming active layer 113 containing a conductive polymer onto carbon layer 112 of the laminate to yield positive electrode 11. A third step is laminating yielded positive electrode 11, separator 13 and negative electrode 12 in this order to yield electrode group 10. A fourth step is housing yielded electrode group 10 together with a nonaqueous electrolytic solution into container 101. The formation of active layer 113 is usually attained in an acidic atmosphere by effect of an oxidizing agent or dopant to be used.

The method for forming barrier layer 114 and carbon layer 112 in this order onto positive current collector 111 is as described above.

Active layer 113 is formed, for example, by subjecting a raw material monomer to electrolytic polymerization or chemical polymerization in the presence of positive current collector 111 having barrier layer 114 and carbon layer 112. Alternatively, the formation is attained by giving, for example, a solution containing a conductive polymer or a dispersion of a conductive polymer to positive current collector 111 having carbon layer 112. Also when active layer 113 is formed in an acidic atmosphere, active layer 113 is homogeneously formed since barrier layer 114 having acid resistance restrains positive current collector 111 from being damaged or oxidized.

A lead member (lead tab 105A having lead wire 104A) is connected to positive electrode 11 yielded as described above. Another lead member (lead tab 105B having lead wire 104B) is connected to negative electrode 12. Subsequently, separator 13 is interposed between positive electrode 11 and negative electrode 12, to which these lead members are respectively connected, so as to yield electrode group 10 as illustrated in FIG. 3, which has one end surface from which the lead members are naked. An outermost periphery of electrode group 10 is fixed with fastening tape 14.

Next, as illustrated in FIG. 2, electrode group 10 is housed, together with a nonaqueous electrolytic solution (not illustrated), in bottomed cylindrical container 101 having an opening. Lead wires 104A and 104B are led out from sealing body 102. Sealing body 102 is disposed in the opening in container 101 to seal container 101. Specifically, container 101 is, at its part near an end of the opening, processed inward by drawing, and the opening end is curled to swage sealing body 102. Sealing body 102 is formed of, for example, an elastic material containing a rubber component.

In the above-mentioned exemplary embodiment, a wound-type electrochemical device having a cylindrical shape has been described. However, the application scope of the present invention is not limited to this wound-type electrochemical device. Thus, the present invention can also be applied to a rectangular wound-type or a stacked-type electrochemical device.

EXAMPLES

Hereinafter, the present invention will be described in more detail by way of examples. The present invention, however, is not limited to the examples.

Example 1

(1) Preparation of Positive Electrode

A laminate was prepared in which an aluminum carbide layer (thickness: 100 nm; proportion by mass of carbon atoms: 25% by mass) and a carbon layer (thickness: 2 μm) containing carbon black were successively formed onto each surface of an aluminum foil piece having a thickness of 30 µm. Meanwhile, an aqueous aniline solution containing aniline and sulfuric acid was prepared.

The laminate and a counter electrode were immersed in the aqueous aniline solution, and subjected to electrolytic polymerization at a current density of 10 mA/cm$^2$ for 20 minutes to deposit a film of a conductive polymer (polyaniline) doped with sulfate ions ($SO_4^{2-}$) onto the carbon layer of each of the surfaces of the laminate.

The conductive polymer doped with the sulfate ions was reduced to dedope the sulfate ions used for the doping. In this way, an active layer which contained the sulfate-ion-dedoped conductive polymer was formed. Next, the active layer was sufficiently washed, and then dried. The active layer had a thickness of 35 µm per surface of the laminate.

(2) Preparation of Negative Electrode

A copper foil piece having a thickness of 20 µm was prepared as a negative current collector. Meanwhile, mixed powder containing 97 parts by mass of hard carbon, 1 part by mass of carboxycellulose, and 2 parts by mass of styrene butadiene rubber was kneaded and mixed with water at a ratio by mass of 40:60 (mixed powder:water) to prepare a negative electrode mixture paste. The negative electrode mixture paste was applied to both surfaces of the negative current collector, and dried to yield a negative electrode having negative electrode material layers each having a thickness of 35 µm, respectively, on both surfaces of this electrode. Next, a metal lithium layer was formed on the negative electrode material layer, an amount of this metal lithium layer being calculated to adjust the negative electrode potential in the electrolytic solution after completion of the pre-doping to less than or equal to 0.2 V relative to that of metal lithium.

(3) Preparation of Electrode Group

A lead tab was connected to each of the positive electrode and the negative electrode. Thereafter, as illustrated in FIG. 3, separators each made of a cellulose nonwoven fabric (thickness of 35 µm) were laminated alternately onto the positive electrode and the negative electrode. The resultant laminate was wound to form an electrode group.

(4) Preparation of Nonaqueous Electrolytic Solution 0.2% by mass of vinylene carbonate was added to a mixture of propylene carbonate and dimethyl carbonate at a ratio by volume of 1:1 to prepare a solvent. $LiPF_6$ as a lithium salt was dissolved in the resulting solvent at a predetermined concentration to prepare a nonaqueous electrolytic solution containing hexafluorophosphate ions ($PF_6^-$) as anions.

(5) Preparation of Electrochemical Device

The electrode group and the nonaqueous electrolytic solution were housed in a bottomed case having an opening to assemble an electrochemical device as illustrated in FIG. 2. Thereafter, the electrochemical device was aged at 25° C. for 24 hours while a charging voltage of 3.8 V was applied to between terminals of the positive electrode and the negative electrode, so as to advance pre-doping of the negative electrode with lithium ions. The resulting electrochemical device was evaluated in accordance with methods described below. Table 1 shows the evaluation results collectively.

(Evaluation Methods)
(1) Internal Resistance (DCR)

A voltage of 3.8 V was applied to the electrochemical device to charge the electrochemical device, and then the electrochemical device was discharged for a predetermined period. From the amount of a drop of the voltage at this time, an initial internal resistance (initial DCR) of the device was obtained.

(2) Float Property

The resulting electrochemical device was continuously charged at 60° C. and 3.6 V for 1000 hours. After this charging, a resistance value of the device was measured to calculate a change ratio of the resistance value with respect to a resistance value before the continuous charging (initial DCR). The change ratio was calculated in accordance with "(the resistance value after the charging for the 1000 hours/the initial DCR)×100". As the change ratio of the resistance value is smaller, float property of the electrochemical device is further restrained from being lowered.

(3) Acid Resistance

One of the electrodes was used as a positive electrode, and a silver foil piece was used as the other electrode. The device sample was subjected to 5 cycles each of which was a step of changing a potential of the sample (vs. Ag/Ag+) as follows: $-0.5\,V \rightarrow +1.5\,V \rightarrow -0.5\,V$ at 10 mV/s in 2M sulfuric acid solution. Thereafter, a measurement was made about a current quantity (leakage current) of the sample at 0.8 V (vs. Ag/Ag+). It is demonstrated that as the current quantity is smaller, the positive current collector is further restrained from being corroded so that the sample is improved in acid resistance by the barrier layer.

Example 2

An electrochemical device was produced and evaluated in the same manner as in Example 1 except that a laminate was used in which a titanium nitride layer (thickness: 10 nm; proportion by mass of nitrogen atoms: 25% by mass), and a carbon layer containing carbon black were successively formed on each of the surfaces of an aluminum foil piece having a thickness of 30 µm. Table 1 shows the evaluation results.

Comparative Example 1

An electrochemical device was produced and evaluated in the same manner as in Example 1 except that a positive electrode was used in which a carbon layer (thickness: 2 µm) containing carbon black and an active layer were successively formed on each of the surfaces of an aluminum foil piece (positive current collector) having a thickness of 30 µm. Table 1 shows the evaluation results.

The carbon layer was formed by applying a carbon paste yielded by mixing carbon black with water glass onto entire front and rear surfaces of the positive current collector, and then heating and drying the resultant. The active layer was formed in the same manner as in Example 1.

Comparative Example 2

An electrochemical device was produced in the same manner as in Comparative Example 1 except that a carbon paste was used in which mixed powder yielded by mixing 11 parts by mass of carbon black with 7 parts by mass of a powdery acrylic resin was kneaded and mixed with water at a ratio by mass of 20:80 (mixed powder:water), and then evaluations for (1) internal resistance (DCR) and (2) float property of this device were performed. Table 1 shows the evaluation results.

Comparative Example 3

An electrochemical device was produced in the same manner as in Comparative Example 2 except that instead of the acrylic resin, a carbon paste into which powdery SBR was incorporated was used, then evaluations for (1) internal resistance (DCR) and (2) float property of this device were performed. Table 1 shows the evaluation results.

TABLE 1

|  | (1) Initial DCR (mΩ) | (2) Float property | (3) Acid resistance (mA/cm$^2$) |
|---|---|---|---|
| Example 1 | 105 | 115% | 0.069 |
| Example 2 | 87 | 140% | 0.058 |
| Comparative Example 1 | 141 | 171% | 0.450 |
| Comparative Example 2 | 167 | 182% | — |
| Comparative Example 3 | 140 | 160% | — |

In each of Comparative Examples 1 to 3, although the polymer material excellent in acid resistance, such as water glass, was incorporated into the carbon layer, the comparative examples were poorer in (1) initial DCR property and (2) float property than Examples 1 and 2. This seems to be because the formation of the active layer was attained in the acidic atmosphere, and further the acid produced in the float charging caused the positive current collector to be damaged or oxidized. Moreover, in (3) acid resistance evaluations, Examples 1 and 2 were sufficiently small in current quantity to gain an effect of improving the acid resistance by the barrier layer.

The electrochemical device according to the present invention is excellent in float property, so that this device is suitable as various electrochemical devices, in particular, power supplies for backup.

The invention claimed is:

1. An electrochemical device comprising
a positive electrode;
a negative electrode; and
a separator disposed between the positive electrode and the negative electrode,
wherein the positive electrode includes:
 a positive current collector containing a first metal,
 a carbon layer containing a conductive carbon material and a polymer material,
 a barrier layer disposed between the positive current collector and the carbon layer, the barrier layer having conductivity and higher acid resistance than the positive current collector, and
 an active layer disposed on the carbon layer, the active layer containing a conductive polymer.

2. The electrochemical device according to claim 1, wherein the first metal is aluminum.

3. The electrochemical device according to claim 1, wherein the barrier layer contains a compound of the first metal and at least one of carbon or nitrogen.

4. The electrochemical device according to claim 1, wherein the barrier layer contains a compound of a second metal and at least one of carbon or nitrogen, the second metal being different from the first metal and including at least one of the group consisting of aluminum, nickel, and titanium.

5. The electrochemical device according to claim 1, wherein the barrier layer contains a third metal having lower ionization tendency than the first metal.

6. The electrochemical device according to claim 5, wherein the third metal contains at least one of nickel or titanium.

7. The electrochemical device according to claim 1, wherein:
the conductive carbon material includes at least one of the group consisting of graphite, hard carbon, soft carbon, and carbon black, and
an average diameter of the conductive carbon material ranges from 3 nm to 500 nm, inclusive.

8. The electrochemical device according to claim 1, wherein the polymer material includes at least one of the group consisting of fluororesin, acrylic resin, polyvinyl chloride, styrene-butadiene rubber, or water glass.

9. The electrochemical device according to claim 1, wherein a thickness of the carbon layer ranges from 1 μm to 20 μm, inclusive.

10. An electrochemical device comprising:
a positive electrode;
a negative electrode; and
a separator disposed between the positive electrode and the negative electrode, wherein:
the positive electrode includes:
 a positive current collector containing a first metal,
 a carbon layer containing a conductive carbon material and a polymer material,
 a barrier layer disposed between the positive current collector and the carbon layer, the barrier layer having conductivity and higher acid resistance than the positive current collector, and
 an active layer disposed on the carbon layer, the active layer containing a conductive polymer, and
the polymer material includes at least one of the group consisting of fluororesin, acrylic resin, polyvinyl chloride, styrene-butadiene rubber, or water glass.

11. An electrochemical device comprising:
a positive electrode;
a negative electrode; and
a separator disposed between the positive electrode and the negative electrode, wherein:
the positive electrode includes:
 a positive current collector containing a first metal,
 a carbon layer containing a conductive carbon material and a polymer material,
 a barrier layer disposed between the positive current collector and the carbon layer, the barrier layer having conductivity and higher acid resistance than the positive current collector, and
 an active layer disposed on the carbon layer, the active layer containing a conductive polymer, and
a thickness of the carbon layer ranges from 1 μm to 20 μm, inclusive.

* * * * *